(12) United States Patent
Kitajima et al.

(10) Patent No.: US 11,431,361 B2
(45) Date of Patent: Aug. 30, 2022

(54) RADIO-FREQUENCY MODULE AND COMMUNICATION APPARATUS

(71) Applicant: Murata Manufacturing Co., Ltd., Kyoto (JP)

(72) Inventors: Hiromichi Kitajima, Kyoto (JP); Takanori Uejima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/396,887

(22) Filed: Aug. 9, 2021

(65) Prior Publication Data

US 2022/0052713 A1    Feb. 17, 2022

(30) Foreign Application Priority Data

Aug. 13, 2020 (JP) .............................. JP2020-136573

(51) Int. Cl.
*H04B 1/04*  (2006.01)
*H04L 5/14*  (2006.01)
*H04B 1/405*  (2015.01)

(52) U.S. Cl.
CPC .............. *H04B 1/04* (2013.01); *H04B 1/405* (2013.01); *H04L 5/14* (2013.01); *H04B 2001/0408* (2013.01)

(58) Field of Classification Search
CPC .. H04B 1/04; H04B 1/405; H04B 2001/0408; H04L 5/14
See application file for complete search history.

(56) References Cited

U.S. PATENT DOCUMENTS

| | | | |
|---|---|---|---|
| 2015/0133067 A1 | 5/2015 | Chang et al. | |
| 2018/0226928 A1* | 8/2018 | Obiya | H04B 1/00 |
| 2019/0190548 A1* | 6/2019 | Chang | H04L 5/001 |
| 2020/0036401 A1* | 1/2020 | Ella | H04B 1/525 |

\* cited by examiner

*Primary Examiner* — Nguyen T Vo
(74) *Attorney, Agent, or Firm* — Pearne & Gordon LLP (57) ABSTRACT

A radio-frequency module includes a power amplifier, a low noise amplifier, a first switch connected to an antenna connection terminal, a first filter, and a module substrate. The first filter has a passband including a first communication band for Time Division Duplex, has a first end connected to the antenna connection terminal via the first switch, has a second end connected to an output terminal of the power amplifier or an input terminal of the low noise amplifier. The module substrate has the power amplifier, the low noise amplifier, the first switch, and the first filter arranged thereon. The first filter is arranged between the power amplifier and the first switch and between the power amplifier and the low noise amplifier in a plan view of the module substrate.

13 Claims, 4 Drawing Sheets

RADIO-FREQUENCY MODULE AND COMMUNICATION APPARATUS

CROSS REFERENCE TO RELATED APPLICATION

This application claims priority from Japanese Patent Application No. 2020-136573 filed on Aug. 13, 2020. The content of this application is incorporated herein by reference in its entirety.

The present disclosure relates to a radio-frequency module and a communication apparatus.

In mobile communication devices, such as mobile phones, the arrangement configuration of circuit components composing radio-frequency front-end modules is increasingly complicated particularly with the progress of multiband communication. A front-end module is disclosed in U.S. Patent Application Publication No. 2015/0133067, in which a power amplifier, switches, filters, and so on are packaged.

In such a front-end module in the related art, there is a concern that electrical characteristics (for example, noise figure (NF) and gain characteristics) may be degraded.

BRIEF SUMMARY

The present disclosure provides a radio-frequency module and a communication apparatus, which are capable of improving electrical characteristics.

A radio-frequency module according to an embodiment of the present disclosure includes a power amplifier, a low noise amplifier, a first switch connected to an antenna connection terminal, a first filter, and a module substrate. The first filter has a passband including a first communication band for Time Division Duplex, has a first end connected to the antenna connection terminal via the first switch, has a second end connected to an output terminal of the power amplifier or an input terminal of the low noise amplifier. The module substrate has the power amplifier, the low noise amplifier, the first switch, and the first filter arranged thereon. The first filter is arranged between the power amplifier and the first switch and between the power amplifier and the low noise amplifier in a plan view of the module substrate.

A communication apparatus according to an embodiment of the present disclosure includes a signal processing circuit that processes a radio-frequency signal and the radio-frequency module, which transmits the radio-frequency signal processed in the signal processing circuit.

According to the radio-frequency module and the communication apparatus according to the embodiments of the present disclosure, it is possible to improve the electrical characteristics.

Other features, elements, characteristics and advantages of the present disclosure will become more apparent from the following detailed description of embodiments of the present disclosure with reference to the attached drawings.

DETAILED DESCRIPTION

Radio-frequency modules and communication apparatuses according to embodiments of the present disclosure will herein be described in detail with reference to the drawings. All the embodiments described below indicate specific examples of the present disclosure. Accordingly, numerical values, shapes, materials, components, the arrangement of the components, the connection mode of the components, and so on, which are indicated in the embodiments described below, are only examples and are not intended to limit the present disclosure. Among the components in the embodiments described below, the components that are not described in the independent claims are described as optional components.

The respective drawings are schematic diagrams and are not necessarily strictly illustrated. Accordingly, for example, the scales and so on do not necessarily coincide with each other in the respective drawings. The same reference numerals and letters are added to substantially the same components in the respective drawings and a duplicated description of such components is omitted or simplified herein.

In this specification, the terms, such as parallel and vertical, indicating the relationship between elements; the terms, such as rectangles and straight lines, indicating the shapes of the elements; and numerical ranges are not representations indicating only strict meanings but are representations meaning inclusion of substantially the same ranges, for example, differences on the order of few percent.

In this specification, the terms of "up" and "down" do not indicate the up direction (the vertical up direction) and the down direction (the vertical down direction), respectively, in the absolute spatial recognition but are used as the terms defined by the relative positional relationship based on the lamination order in the laminated configuration. The terms of "up" and "down" are applied to not only cases in which two components are arranged with a space therebetween and another component exists between the two components but also cases in which two components are arranged so as to be in close contact with each other and the two components are in touch with each other.

In this specification and the drawings, the x axis, the y axis, and the z axis indicate the three axes in the three-dimensional cartesian coordinate system. When a module substrate has a substantially rectangular shape in a plan view, the x axis and the y axis are the direction parallel to a first face of the rectangle and the direction parallel to a second face perpendicular to the first face, respectively. The z axis is the thickness direction of the module substrate. In this specification, the "thickness direction" of the module substrate means the direction vertical to the main surface of the module substrate.

In this specification, "connected" includes not only direct connection with a connection terminal and/or a wiring conductor but also electrical connection via another circuit element. "Connected between A and B" means connected to both A and B between A and B.

In the arrangement of components of the present disclosure, a "plan view of the module substrate" means viewing an object that is orthographically projected on the x-y plane from the positive side of the z axis. The "distance between A and B in a plan view of the module substrate" means the length of a line segment between a representative point in the area of A, which is orthographically projected on the x-y plane, and a representative point in the area of B, which is orthographically projected on the x-y plane. Although the center point of the area, a point in one area closest to the other area, and so on can be used as the representative point here, the representative point is not limited to these points.

"Arrangement of a component on a substrate" includes arrangement of the component above the substrate without necessarily being in contact with the substrate (for example, lamination of the component on another component arranged on the substrate) and embedding of part of the component or the entire component in the substrate, in addition to arrangement of the component on the substrate with being in contact with the substrate. In addition, "arrangement of a component on the main surface of a substrate" includes arrangement of the component above the main surface without necessarily being in contact with the main surface and embedding of part of the component in the substrate from the main surface side, in addition to arrangement of the component on the main surface with being in contact with the main surface of the substrate. "Arrangement of A between B and C" means passing of at least one line segment through A, among multiple line segments between an arbitrary point in B and an arbitrary point in C.

In this specification, ordinal numbers, such as "the first" and "the second", do not mean the number of components or the order of the components but are used to discriminate similar components for avoidance of confusion, if not otherwise specified.

Embodiment

1. Circuit Configuration of Radio-Frequency Module and Communication Apparatus

Figure 1:
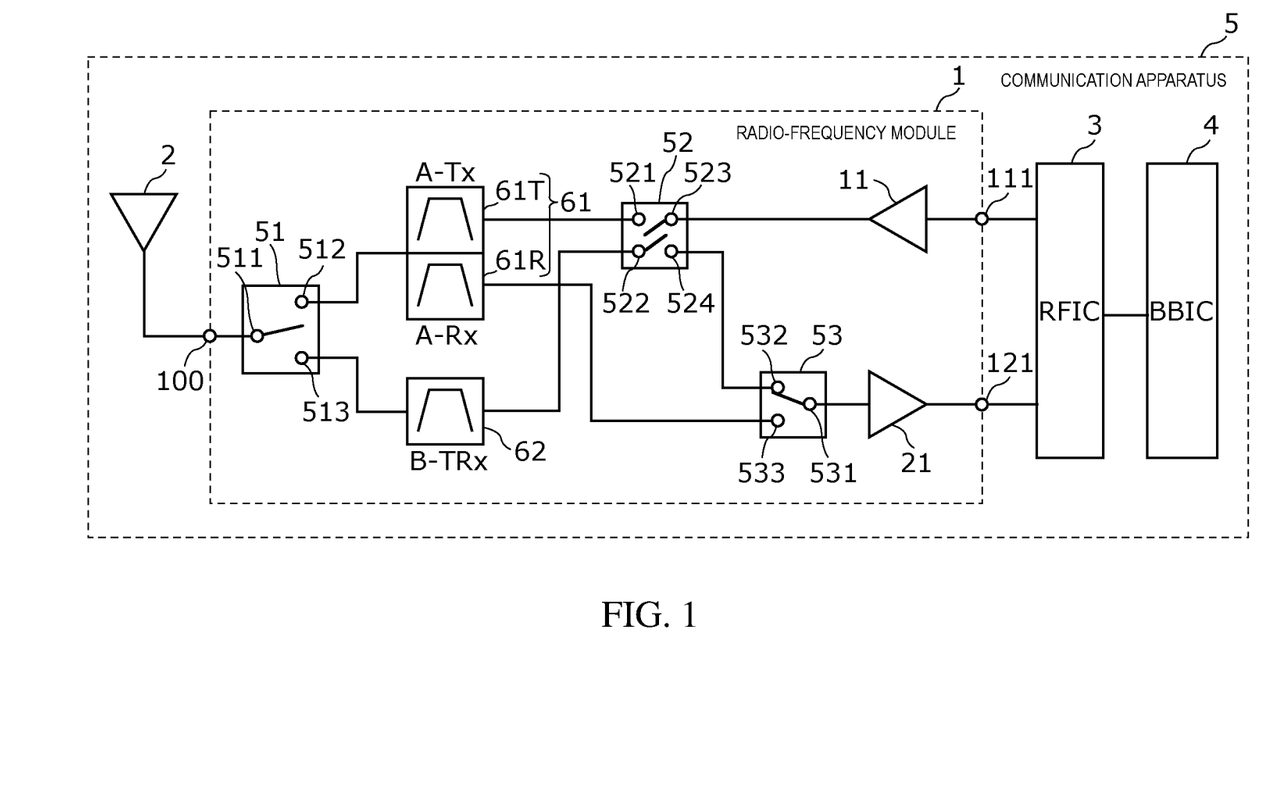
FIG. 1 is a diagram illustrating the circuit configuration of a radio-frequency module and a communication apparatus according to an embodiment.

The circuit configuration of a radio-frequency module and a communication apparatus according to an embodiment will be described with reference to FIG. 1. FIG. 1 is a diagram illustrating the circuit configuration of a radio-frequency module 1 and a communication apparatus 5 according to the present embodiment.

[1-1. Circuit Configuration of Communication Apparatus]

The circuit configuration of the communication apparatus 5 will now be described. The communication apparatus 5 is used in a communication system and is a mobile terminal, such as a smartphone or a tablet computer. Referring to FIG. 1, the communication apparatus 5 according to the present embodiment includes the radio-frequency module 1, an antenna 2, a radio-frequency integrated circuit (RFIC) 3, and a baseband integrated circuit (BBIC) 4.

The radio-frequency module 1 transmits a radio-frequency signal between the antenna 2 and the RFIC 3. The internal configuration of the radio-frequency module 1 will be described below.

The antenna 2 is connected to an antenna connection terminal 100 of the radio-frequency module 1. A radio-frequency signal output from the radio-frequency module 1 is transmitted through the antenna 2, and a radio-frequency signal is externally received through the antenna 2 and is supplied to the radio-frequency module 1.

The RFIC 3 is an example of a signal processing circuit that processes the radio-frequency signal. Specifically, the RFIC 3 performs signal processing, such as down-conversion, to a radio-frequency reception signal input through a reception path of the radio-frequency module 1 and supplies a reception signal resulting from the signal processing to the BBIC 4. In addition, the RFIC 3 performs signal processing, such as up-conversion, to a transmission signal supplied from the BBIC 4 and supplies a radio-frequency transmission signal resulting from the signal processing to a transmission path of the radio-frequency module 1. The RFIC 3 includes a control unit that controls switches, amplifiers, and so on in the radio-frequency module 1. Part of or all the function of the RFIC 3 serving as the control unit may be installed outside the RFIC 3 or may be installed in, for example, the BBIC 4 or the radio-frequency module 1.

The BBIC 4 is a baseband signal processing circuit that performs signal processing using an intermediate frequency band lower than the frequency of the radio-frequency signal transmitted by the radio-frequency module 1. For example, an image signal for image display and/or an audio signal for talking with a speaker is used as the signal processed in the BBIC 4.

In the communication apparatus 5 according to the present embodiment, the antenna 2 and the BBIC 4 are optional components.

[1-2. Circuit Configuration of Radio-Frequency Module]

The circuit configuration of the radio-frequency module 1 will now be described. Referring to FIG. 1, the radio-frequency module 1 includes a power amplifier 11, a low noise amplifier 21, switches 51 to 53, a duplexer 61, a transmission-reception filter 62, the antenna connection terminal 100, a radio-frequency input terminal 111, and a radio-frequency output terminal 121.

The antenna connection terminal 100 is connected to the antenna 2.

The radio-frequency input terminal 111 is a terminal for receiving the radio-frequency transmission signal from the outside of the radio-frequency module 1. In the present embodiment, the radio-frequency input terminal 111 is a terminal for receiving transmission signals in communication bands A and B from the RFIC 3.

The radio-frequency output terminal 121 is a terminal for supplying the radio-frequency reception signal to the outside of the radio-frequency module 1. In the present embodiment, the radio-frequency output terminal 121 is a terminal for supplying reception signals in the communication bands A and B to the RFIC 3.

The communication band means a frequency band defined in advance for a communication system by standards bodies or the likes (for example, 3rd Generation Partnership Project (3GPP) and Institute of Electrical and Electronics Engineers (IEEE)).

Here, the communication system means a communication system that is built using a radio access technology (RAT). Although, for example, a 5th Generation New Radio (5G NR) system, a Long Term Evolution (LTE) system, and a Wireless Local Area Network (WLAN) system may be used as the communication system, the communication system is not limited to these systems.

The communication band A is an example a second communication band. In the present embodiment, a communication band for Frequency Division Duplex (FDD) is used as the communication band A. More specifically, although Band B1, Band B2, Band B3, or Band B7 for the LTE or Band n1, Band n2, Band n3, or Band n7 for the 5G NR is used as the communication band A, the communication band A is not limited to these bands.

The communication band B is an example of a first communication band. In the present embodiment, a communication band for Time Division Duplex (TDD) is used as the communication band B. More specifically, although Band B32, Band B39, Band B40, or Band B41 for the LTE or Band n39, Band n40, or Band n41 for the 5G NR is used as the communication band B, the communication band B is not limited to these bands.

The power amplifier 11 is capable of amplifying the transmission signals in the communication bands A and B received through the radio-frequency input terminal 111. Here, an input terminal of the power amplifier 11 is connected to the radio-frequency input terminal 111 and an output terminal of the power amplifier 11 is connected to the switch 52.

The configuration of the power amplifier 11 is not particularly restricted. For example, the power amplifier 11 may have a single-stage configuration or a multistage configuration. For example, the power amplifier 11 may include multiple amplifier elements that are cascade-connected to each other. The power amplifier 11 may convert the radio-frequency signal into a differential signal (that is, complementary signal) for amplification. The power amplifier 11 may be called a differential amplifier.

The low noise amplifier 21 is capable of amplifying the reception signals in the communication bands A and B received through the antenna connection terminal 100. Here, an input terminal of the low noise amplifier 21 is connected to the switch 53 and an output terminal of the low noise amplifier 21 is connected to the radio-frequency output terminal 121. The reception signals in the communication bands A and B, which are amplified by the low noise amplifier 21, are supplied to the radio-frequency output terminal 121.

The configuration of the low noise amplifier 21 is not particularly restricted. For example, the low noise amplifier 21 may have a single-stage configuration or a multistage configuration and may be a differential amplifier.

The duplexer 61 passes the radio-frequency signal in the communication band A. The duplexer 61 transmits the transmission signal and the reception signal in the communication band A using the FDD method. The duplexer 61 includes a transmission filter 61T and a reception filter 61R.

The transmission filter 61T is an example of a second filter and has a passband including an uplink operating band of the communication band A. One end of the transmission filter 61T is connected to the antenna connection terminal 100 via the switch 51. The other end of the transmission filter 61T is connected the output terminal of the power amplifier 11 via the switch 52.

The uplink operating band means part of the communication band specified for uplink. The uplink operating band means a transmission band in the radio-frequency module 1.

The reception filter 61R is an example of a third filter and has a passband including a downlink operating band of the communication band A. One end of the reception filter 61R is connected to the antenna connection terminal 100 via the switch 51. The other end of the reception filter 61R is connected to the input terminal of the low noise amplifier 21 via the switch 53.

The downlink operating band means part of the communication band specified for downlink. The downlink operating band means a reception band in the radio-frequency module 1.

The transmission-reception filter 62 is an example of a first filter and has a passband including the communication band B. One end of the transmission-reception filter 62 is connected to the antenna connection terminal 100 via the switch 51. The other end of the transmission-reception filter 62 is connected to the output terminal of the power amplifier 11 via the switch 52 and is connected to the input terminal of the low noise amplifier 21 via the switches 52 and 53.

Each of the transmission filter 61T, the reception filter 61R, and the transmission-reception filter 62 may be, for example, any of a surface-acoustic-wave filter, an acoustic wave filter using bulk acoustic waves (BAWs), an LC resonant filter, and a dielectric filter and is not limited to these filters.

The switch 51 is an example of a first switch. The switch 51 is connected to the antenna connection terminal 100, the output terminal of the power amplifier 11, and the input terminal of the low noise amplifier 21. Specifically, the switch 51 has terminals 511 to 513. The terminal 511 is connected to the antenna connection terminal 100. The terminals 512 and 513 are connected to the duplexer 61 and the transmission-reception filter 62, respectively.

In this connection configuration, the switch 51 is capable of connecting at least one of the terminals 512 and 513 to the terminal 511, for example, based on a control signal from the RFIC 3. In other words, the switch 51 is capable of switching between connection and non-connection between the antenna 2 and the duplexer 61 and the transmission-reception filter 62. The switch 51 is composed of, for example, a multi-connection-type switch circuit and is called an antenna switch.

The switch 52 is an example of a second switch. The switch 52 is connected to the output terminal of the power amplifier 11. In addition, the switch 52 is connected to the transmission filter 61T, to the transmission-reception filter 62, and to the input terminal of the low noise amplifier 21 via the switch 53. Specifically, the switch 52 has terminals 521 to 524. The terminals 521 and 522 are connected to the transmission filter 61T and the transmission-reception filter 62, respectively. The terminal 523 is connected to the output terminal of the power amplifier 11. The terminal 524 is connected to a terminal 532 of the switch 53 and is connected to the input terminal of the low noise amplifier 21 via the switch 53.

In this connection configuration, the switch 52 is capable of connecting the terminal 521 to the terminal 523 and connecting the terminal 522 to either of the terminals 523 and 524, for example, based on a control signal from the RFIC 3. In other words, the switch 52 is capable of switching between connection and non-connection between the transmission filter 61T and the power amplifier 11 and connection and non-connection between the transmission-reception filter 62 and each of the power amplifier 11 and the low noise amplifier 21. The switch 52 is composed of, for example, a multi-connection-type switch circuit.

The switch 53 is an example of a third switch. The switch 53 is connected to the input terminal of the low noise amplifier 21. In addition, the switch 53 is connected to the reception filter 61R and to the transmission-reception filter 62 via the switch 52. Specifically, the switch 53 has terminals 531 to 533. The terminal 531 is connected to the input terminal of the low noise amplifier 21. The terminal 532 is connected to the terminal 524 of the switch 52 and to the transmission-reception filter 62 via the switch 52. The terminal 533 is connected to the reception filter 61R.

In this connection configuration, the switch 53 is capable of connecting the terminal 532 and/or the terminal 533 to the terminal 531, for example, based on a control signal from the RFIC 3. In other words, the switch 53 is capable of switching between connection and non-connection between the reception filter 61R and the low noise amplifier 21 and connection and non-connection between the transmission-reception filter 62 and the low noise amplifier 21. The switch 53 is composed of, for example, a multi-connection-type switch circuit.

Some of the circuit elements illustrated in FIG. 1 may not be included in the radio-frequency module 1. For example, it is sufficient for the radio-frequency module 1 to at least include the power amplifier 11, the low noise amplifier 21, the switch 51, and the transmission-reception filter 62 and the radio-frequency module 1 may not include the other circuit elements.

2. Arrangement of Components in Radio-Frequency Module

The arrangement of the components in the radio-frequency module 1 configured in the above manner will now be specifically described with reference to FIG. 2 and FIG. 3.

Figure 2:
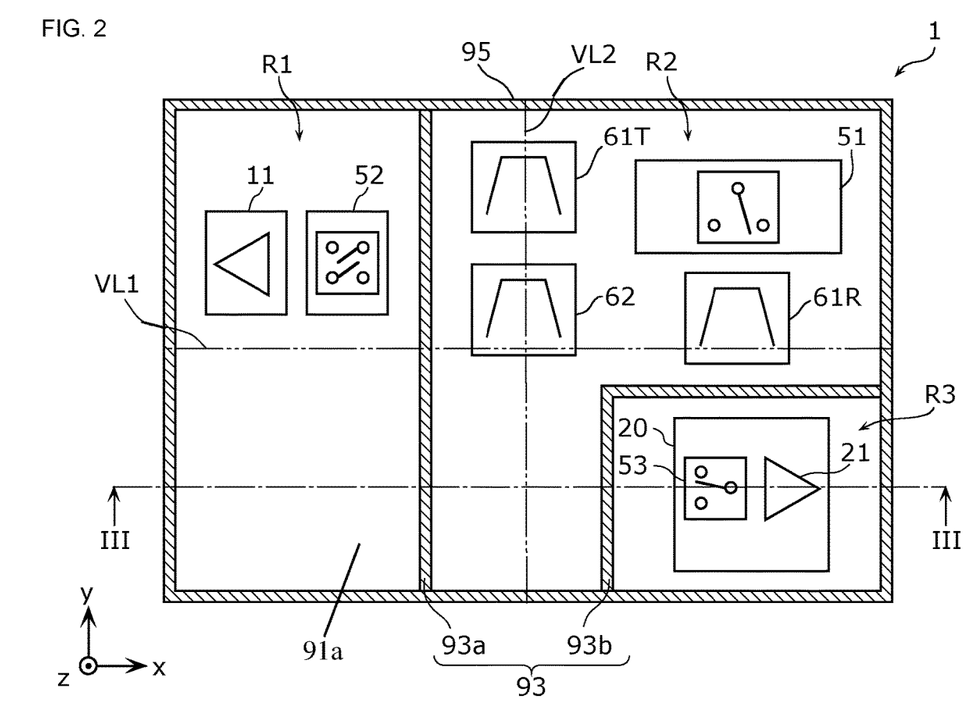
FIG. 2 is a plan view of the radio-frequency module according to the present embodiment.

FIG. 2 is a plan view of the radio-frequency module 1 according to the present embodiment. Specifically, FIG. 2 is a diagram when a main surface 91a of a module substrate 91 is viewed from the positive side of the z axis. FIG. 3 is a cross-sectional view of the radio-frequency module 1 according to the present embodiment. The cross section of the radio-frequency module 1 in FIG. 3 is a cross section taken along the III-III line in FIG. 2.

Figure 3:
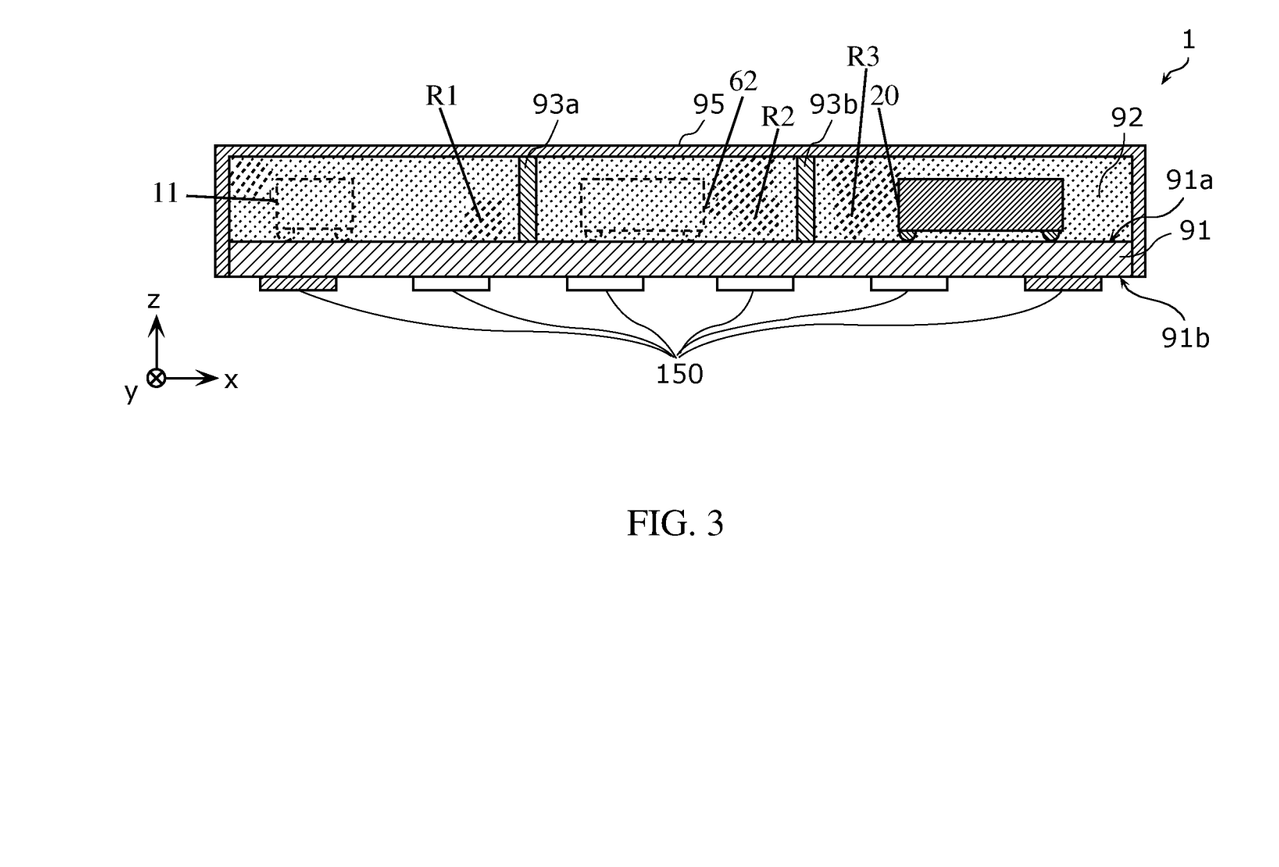
FIG. 3 is a cross-sectional view of the radio-frequency module according to the present embodiment.

Referring to FIG. 2 and FIG. 3, the radio-frequency module 1 includes the module substrate 91, a resin member 92, a conductive member 93, a shielding film 95, and multiple electrode terminals 150, in addition to circuit components including the circuit elements illustrated in FIG. 1. The illustration of the upper portions of the resin member 92 and the shielding film 95 is omitted in FIG. 2. The conductive member 93 and side wall portions of and the shielding film 95 are hatched in FIG. 2 to make the shapes of the conductive member 93 and the side wall portions of the shielding film 95 more visible. The power amplifier 11 and the transmission-reception filter 62, which are positioned at the deep side of the cross section taken along the III-III line, are represented using broken lines in FIG. 3.

The module substrate 91 has the main surface 91a and a main surface 91b, which are opposed to each other. Although the module substrate 91 has a substantially rectangular shape in a plan view in the present embodiment, the shape of the module substrate 91 in a plan view is not limited to this. Although, for example, a low temperature co-fired ceramic (LTCC) substrate having a laminated structure of multiple dielectric layers, a high temperature co-fired ceramic (HTCC) substrate, a component built-in substrate, a substrate including a redistribution layer (RDL), or a printed circuit board may be used as the module substrate 91, the module substrate 91 is not limited to these substrates.

The main surface 91a is an example of a first main surface and may be called a top face or a surface. The power amplifier 11, the low noise amplifier 21, the switches 51 to 53, the transmission filter 61T, the reception filter 61R, and the transmission-reception filter 62 are arranged on the main surface 91a, as illustrated in FIG. 2. In other words, all the circuit elements (excluding external connection terminals) composing the radio-frequency module 1 are arranged on the main surface 91a. The components on the main surface 91a are sealed with the resin member 92, as illustrated in FIG. 3.

The main surface 91b is an example of a second main surface and may be called a bottom face or a rear face. The multiple electrode terminals 150 are arranged on the main surface 91b, as illustrated in FIG. 3.

The multiple electrode terminals 150 are an example of the multiple external connection terminals. The multiple electrode terminals 150 include a ground terminal, in addition to the antenna connection terminal 100, the radio-frequency input terminal 111, and the radio-frequency output terminal 121 illustrated in FIG. 1. Each of the multiple electrode terminals 150 is connected to, for example, an input-output terminal and/or the ground terminal on a mother board arranged at the negative side of the z axis of the radio-frequency module 1. Although pad electrodes may be used as the multiple electrode terminals 150, the multiple electrode terminals 150 are not limited to the pad electrodes.

The resin member 92 is arranged on the main surface 91a of the module substrate 91. The main surface 91a and the circuit components on the main surface 91a are covered with the resin member 92. The resin member 92 has a function to ensure the reliabilities, such as the mechanical strength and the moisture resistance, of the components on the main surface 91a.

The conductive member 93 divides the main surface 91a of the module substrate 91 into three areas R1 to R3. The sizes and the shapes of the areas R1 to R3 are not particularly restricted. An example of how the components are arranged in the respective areas R1 to R3 is described below.

The conductive member 93 is set to ground potential. For example, the conductive member 93 is connected to a ground conductor (not illustrated) in the module substrate 91 via a via conductor (not illustrated) to be set to the ground potential. In addition, the conductive member 93 is connected to the shielding film 95 to be set to the ground potential. The conductive member 93 is projected from the main surface 91a. The conductive member 93 suppresses electromagnetic coupling between the components arranged in the respective divided areas R1 to R3. This suppresses flowing of noise into the radio-frequency signal transmitted through the respective components.

As illustrated in FIG. 2 and FIG. 3, the conductive member 93 includes a first partition wall 93a and a second partition wall 93b. Each of the first partition wall 93a and the second partition wall 93b is made of a metal material.

The first partition wall 93a is a wall body for division between the area R1 and the area R2. As illustrated in FIG. 2, the first partition wall 93a is a long flat plate linearly extending along the y-axis direction and is in contact with the shielding film 95 with side end faces at both sides in the y-axis direction. As illustrated in FIG. 3, the first partition wall 93a is provided vertically to the main surface 91a and the upper end face of the first partition wall 93a is in contact with the shielding film 95. Specifically, each of the upper end face and the side end faces of the first partition wall 93a is entirely in contact with the shielding film 95 so as to form no gap between the first partition wall 93a and the shielding film 95. This enables the area R1 to be completely isolated from the area R2 and the area R3.

The second partition wall 93b is a wall body for division between the area R2 and the area R3. As illustrated in FIG. 2, the second partition wall 93b is a substantially L-shaped plate extending in the y-axis direction and the x-axis direction. The second partition wall 93b is in contact with the shielding film 95 with the respective side end faces. As illustrated in FIG. 3, the second partition wall 93b is provided vertically to the main surface 91a and the upper end face of the second partition wall 93b is in contact with the shielding film 95. Specifically, each of the upper end face and the side end faces of the second partition wall 93b is entirely in contact with the shielding film 95 so as to form no gap between the second partition wall 93b and the shielding film 95. This enables the area R3 to be completely isolated from the area R1 and the area R2.

The first partition wall 93a and the second partition wall 93b are, for example, metallic bodies subjected to plating growth using a plating method. The first partition wall 93a and the second partition wall 93b may be formed, for example, in the following process.

First, a recess is formed in a predetermined area on the main surface 91a of the module substrate 91 using photosensitive resist or the like to cause a seed layer, which serves as a plating ground, to expose from the module substrate 91. Next, metal, such as gold or copper, is grown on the exposed seed layer through electrolytic plating to concurrently form the first partition wall 93a and the second partition wall 93b.

The shielding film 95 is a metallic thin film that is formed using, for example, a sputtering method. The shielding film 95 is formed so as to cover the upper surface and the side faces of the resin member 92 and the side faces of the module substrate 91. The shielding film 95 is set to the ground potential to suppress external noise from entering the circuit components composing the radio-frequency module 1.

In the present embodiment, the main surface 91a of the module substrate 91 is divided into the three areas R1 to R3 with the conductive member 93, as illustrated in FIG. 2.

The area R1 is an example of a first area. The power amplifier 11 is arranged in the area R1. In addition, the switch 52 connected to the output terminal of the power amplifier 11 is arranged in the area R1. The area R1 is surrounded by the first partition wall 93a of the conductive member 93 and the shielding film 95.

The area R2 is an example of a second area. The switch 51 connected to the antenna connection terminal 100 is arranged in the area R2. In addition, the transmission filter 61T, the reception filter 61R, and the transmission-reception filter 62 are arranged in the area R2. The area R2 is surrounded by the first partition wall 93a and the second partition wall 93b of the conductive member 93 and the shielding film 95.

The transmission-reception filter 62 is arranged between the power amplifier 11 and the switch 51 and between the power amplifier 11 and the low noise amplifier 21 in a plan view of the module substrate 91. For example, the transmission-reception filter 62 is arranged in a central portion of the module substrate 91 having a substantially rectangular shape in a plan view. In the present embodiment, the main surface 91a may be divided into four sections (quadrants) having the same size with two virtual straight lines VL1 and VL2, as illustrated in FIG. 2. The intersection of the two straight lines VL1 and VL2 is the center of the main surface 91a. The center is positioned in the transmission-reception filter 62.

The transmission filter 61T is arranged between the power amplifier 11 and the switch 51 in a plan view of the module substrate 91. The reception filter 61R is arranged between the low noise amplifier 21 and the switch 51 in a plan view of the module substrate 91.

The area R3 is an example of a third area. The low noise amplifier 21 is arranged in the area R3. In addition, the switch 53 connected to the input terminal of the low noise amplifier 21 is arranged in the area R3. The area R3 is surrounded by the second partition wall 93b of the conductive member 93 and the shielding film 95.

In the present embodiment, the low noise amplifier 21 and the switch 53 are included in one electronic component 20, as illustrated in FIG. 2. The electronic component 20 is, for example, one semiconductor integrated circuit. The semiconductor integrated circuit is composed of, for example, complementary metal oxide semiconductor (CMOS) and, specifically, may be formed through a silicon on insulator (SOI) process. Accordingly, it is possible to inexpensively manufacture the semiconductor integrated circuit. The semiconductor integrated circuit may be made of at least one of GaAs, SiGe, and GaN. This enables the low noise amplifier having high-quality amplification performance and noise performance to be realized.

As described above, the main surface 91a may be divided into the four sections (quadrants) having the same size with the two virtual straight lines VL1 and VL2, as illustrated in FIG. 2. The quadrants are referred to as a first quadrant to a fourth quadrant in the order of the upper right section, the upper left section, the lower left section, and the lower right section. The first quadrant to the fourth quadrant has the same size. In the example illustrated in FIG. 2, the switch 51 is arranged in the first quadrant. The power amplifier 11 and the switch 52 are arranged in the second quadrant. The low noise amplifier 21 and the switch 53 are arranged in the fourth quadrant.

The transmission filter 61T and the transmission-reception filter 62 are arranged in a line on the virtual straight line VL2. The reception filter 61R and the transmission-reception filter 62 are arranged in a line on the virtual straight line VL1.

The example of how the components are arranged illustrated in FIG. 2 is only an example and the arrangement of the respective components may be appropriately varied. For example, at least one of the power amplifier 11 and the switch 52 may be arranged in the third quadrant. At least one of the transmission filter 61T, the reception filter 61R, and the transmission-reception filter 62 may not be on the straight lines VL1 and VL2 and may be arranged in any of the first quadrant to the fourth quadrant.

In the present embodiment, the resin member 92, the conductive member 93, and the shielding film 95 are optional components. In other words, the main surface 91a may not be divided into the three areas R1 to R3. The main surface 91a may be divided into two areas or four or more areas or may not be divided.

3. Advantages

As described above, the radio-frequency module 1 according to the present embodiment includes the power amplifier 11, the low noise amplifier 21, the switch 51 connected to the antenna connection terminal 100, the transmission-reception filter 62, and the module substrate 91. The transmission-reception filter 62 has the passband including the communication band B for Time Division Duplex, has one end connected to the antenna connection terminal 100 via the switch 51, and has the other end connected to the output terminal of the power amplifier 11 or the input terminal of the low noise amplifier 21. The module substrate 91 has the power amplifier 11, the low noise amplifier 21, the switch 51, and the transmission-reception filter 62 arranged thereon. The transmission-reception filter 62 is arranged between the power amplifier 11 and the switch 51 and between the power amplifier 11 and the low noise amplifier 21 in a plan view of the module substrate 91.

With the above configuration, the transmission-reception filter 62 is arranged relatively close to all the power amplifier 11, the low noise amplifier 21, and the switch 51. Accordingly, the line length between the transmission-reception filter 62 and the power amplifier 11, the line length between the transmission-reception filter 62 and the low noise amplifier 21, and the line length between the transmission-reception filter 62 and the switch 51 are decreased. Since the line length between the transmission-reception filter 62 through which both the transmission signal and the reception signal are transmitted and each element is decreased, it is possible to suppress the influence of stray capacitance and so on of these lines to suppress degradation of loss characteristics in both transmission and reception. In addition, since the electrical coupling, the magnetic coupling, or the electromagnetic coupling of these lines with the circuit components, other lines, and so on is suppressed, it is possible to suppress degradation of isolation characteristics between transmission and reception. As described above, with the radio-frequency module 1 according to the present embodiment, it is possible to improve electrical characteristics.

For example, the radio-frequency module 1 further includes the transmission filter 61T that has the passband including the uplink operating band of the communication band A for Frequency Division Duplex, that has one end connected to the antenna connection terminal 100 via the switch 51, and that has the other end connected to the output terminal of the power amplifier 11. The transmission filter 61T is arranged between the power amplifier 11 and the switch 51 in a plan view of the module substrate 91.

With the above configuration, the transmission filter 61T is arranged relatively close to the power amplifier 11 and the switch 51. Accordingly, since the line length between the transmission filter 61T and the power amplifier 11 and the line length between the transmission filter 61T and the switch 51 are decreased, it is possible to suppress the degradation of the loss characteristics and the degradation of the isolation characteristics due to the lines. Accordingly, it is possible to further improve the electrical characteristics of the radio-frequency module 1.

For example, the radio-frequency module 1 further includes the switch 52 connected to the output terminal of the power amplifier 11. The transmission-reception filter 62 and the transmission filter 61T are connected to the output terminal of the power amplifier 11 via the switch 52.

With the above configuration, since the power amplifier 11 is used in both of the communication bands A and B, it is possible to decrease the number of the components and this contributes to reduction in size of the radio-frequency module 1.

For example, the radio-frequency module 1 further includes the reception filter 61R that has the passband including the downlink operating band of the communication band A, that has one end connected to the antenna connection terminal 100 via the switch 51, and that has the other end connected to the input terminal of the low noise amplifier 21. The reception filter 61R is arranged between the low noise amplifier 21 and the switch 51 in a plan view of the module substrate 91.

With the above configuration, the reception filter 61R is arranged relatively close to the low noise amplifier 21 and the switch 51. Accordingly, since the line length between the reception filter 61R and the low noise amplifier 21 and the line length between the reception filter 61R and the switch 51 are decreased, it is possible to suppress the degradation of the loss characteristics and the degradation of the isolation characteristics due to the lines. Accordingly, it is possible to further improve the electrical characteristics of the radio-frequency module 1.

For example, the radio-frequency module 1 further includes the switch 53 connected to the input terminal of the low noise amplifier 21. The transmission-reception filter 62 and the reception filter 61R are connected to the input terminal of the low noise amplifier 21 via the switch 53.

With the above configuration, since the low noise amplifier 21 is used in both of the communication bands A and B, it is possible to decrease the number of the components and this contributes to the reduction in size of the radio-frequency module 1.

For example, the module substrate 91 has the main surfaces 91*a* and 91*b* which are opposed to each other. The power amplifier 11, the low noise amplifier 21, the switches 51 to 53, the transmission-reception filter 62, the transmission filter 61T, and the reception filter 61R are arranged on the main surface 91*a*. The multiple external connection terminals are arranged on the main surface 91*b*.

With the above configuration, since the electronic components are arranged on only the main surface 91*a* of the module substrate 91, it is possible to simplify the manufacturing process of the radio-frequency module 1 and to contribute to lowering of the profile of the radio-frequency module 1.

For example, when the main surface 91*a* is virtually divided into the four sections having the same size with the two straight lines VL1 and VL2, the power amplifier 11 and the switch 51 are arranged in two adjacent sections and the low noise amplifier 21 is arranged in a section diagonal to the section in which the power amplifier 11 is arranged.

With the above configuration, since the power amplifier 11 is relatively apart from the low noise amplifier 21, it is possible to suppress the degradation of the isolation characteristics to further improve the electrical characteristics of the radio-frequency module 1.

For example, the radio-frequency module 1 further includes the conductive member 93 with which the main surface 91*a* is divided into the areas R1 to R3 and which is set to the ground potential. The power amplifier 11 and the switch 52 are arranged in the area R1. The switch 51, the transmission-reception filter 62, the transmission filter 61T, and the reception filter 61R are arranged in the area R2. The low noise amplifier 21 and the switch 53 are arranged in the area R3.

With the above configuration, the power amplifier 11 and the low noise amplifier 21 are arranged in the different areas R1 and R3, respectively, among the three areas divided with the conductive member 93, to improve the isolation between the transmission path and the reception path. In addition, the switch 51, the transmission filter 61T, the reception filter 61R, and the transmission-reception filter 62 are arranged in the same area R2 to decrease the line length between the switch 51 and each filter. Accordingly, it is possible to further improve the electrical characteristics of the radio-frequency module 1. Particularly, when concurrent communication using the multiple communication bands is performed, the radio-frequency module 1 is capable of suppressing mismatching loss due to the stray capacitance of the lines and this contributes to improvement of the NF.

For example, the radio-frequency module 1 further includes the resin member 92 with which the power amplifier 11, the low noise amplifier 21, the switches 51 to 53, the transmission-reception filter 62, the transmission filter 61T, the reception filter 61R, and the main surface 91*a* are covered, and the shielding film 95 with which the surface of the resin member 92 is covered. The conductive member 93 is in contact with the shielding film 95.

With the above configuration, it is possible to stabilize the ground potential of the conductive member 93 to improve the spieling effect of the conductive member 93.

The communication apparatus 5 according to the present embodiment includes the RFIC 3 that processes the radio-frequency signal and the radio-frequency module 1, which transmits the radio-frequency signal processed in the RFIC 3.

With the above configuration, it is possible to achieve the same advantages as those of the radio-frequency module 1 described above.

4. Modification

Figure 4:
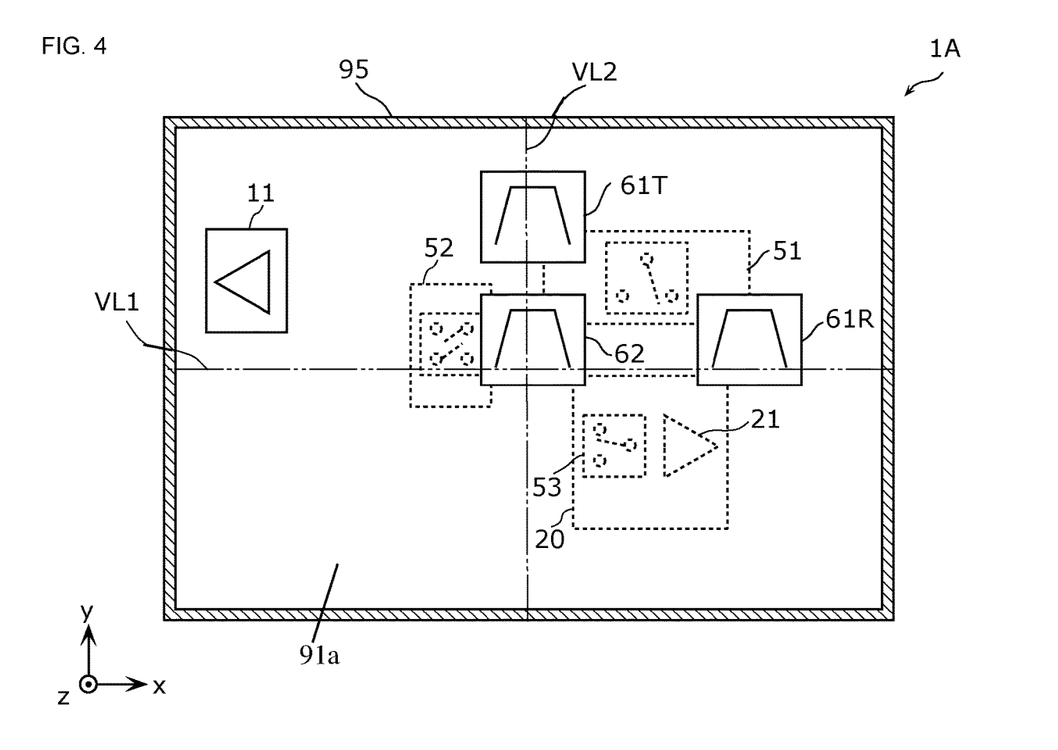
FIG. 4 is a plan view of a radio-frequency module according to a modification of the embodiment.

A modification of the present embodiment will now be described. In a radio-frequency module according to the present modification, the electronic components are arranged on both sides of the module substrate 91.

FIG. 4 is a plan view of a radio-frequency module 1A according to the present modification. Specifically, FIG. 4 is a diagram when the main surface 91a of the module substrate 91 is viewed from the positive side of the z axis. The circuit configuration of the radio-frequency module 1A is the same as that of the radio-frequency module 1 according to the embodiment and the radio-frequency module 1A differs from the radio-frequency module 1 according to the embodiment only in the arrangement of the components.

Referring to FIG. 4, the components arranged on the main surface 91a are represented using solid lines and the components arranged on the main surface 91b opposite to the main surface 91a are represented using broken lines. Specifically, in the radio-frequency module 1A according to the present modification, the power amplifier 11, the transmission filter 61T, the reception filter 61R, and the transmission-reception filter 62 are arranged on the main surface 91a, as illustrated in FIG. 4. The low noise amplifier 21 and the switches 51 to 53 are arranged on the main surface 91b.

Here, the transmission-reception filter 62 is arranged between the power amplifier 11 and the switch 51 and between the power amplifier 11 and the low noise amplifier 21 in a plan view of the main surface 91a. The transmission-reception filter 62 is overlapped with the switch 51 and the electronic component 20 including the low noise amplifier 21 in a plan view. The transmission-reception filter 62 is overlapped with the switch 52 in a plan view. The transmission filter 61T and the reception filter 61R are overlapped with the switch 51 in a plan view. The reception filter 61R is overlapped with the electronic component 20 including the low noise amplifier 21 in a plan view.

Arranging the two or more components so as to be overlapped with each other realizes a reduction in the area of the module substrate 91. In addition, it is possible to decrease the line lengths between the elements to suppress the degradation of the loss characteristics and the degradation of the isolation characteristics due to the lines. Accordingly, it is possible to further improve the electrical characteristics of the radio-frequency module 1A.

The radio-frequency module 1A may be provided with a resin member with which the respective components arranged on the main surface 91b are covered. The shielding film 95 may be provided on the side faces of the resin member with which the main surface 91b is covered. The electrode terminals 150 may be post electrodes passing through the resin member or may be bump electrodes.

As described above, in the radio-frequency module 1A according to the present modification, the module substrate 91 has the main surfaces 91a and 91b, which are opposed to each other. The power amplifier 11, the transmission-reception filter 62, the transmission filter 61T, and the reception filter 61R are arranged on the main surface 91a. The low noise amplifier 21, the switches 51 to 53, and the multiple electrode terminals 150 are arranged on the main surface 91b.

With the above configuration, since the electronic components are arranged on both sides of the module substrate 91, this contributes to the reduction in size of the radio-frequency module 1A.

(Others)

Although the radio-frequency modules and the communication apparatus according to the embodiment of the present disclosure are described above, the present disclosure is not limited to the above embodiment.

For example, other circuit elements, lines, and so on may be provided between the paths connecting the respective circuit elements and the signal paths illustrated in the drawings in the circuit configuration of the radio-frequency module and the communication apparatus according to each embodiment. For example, an impedance matching circuit may be provided at least one of between the duplexer 61 and the switch 51 and between the transmission-reception filter 62 and the switch 51. The impedance matching circuit may be provided, for example, at least one of between the power amplifier 11 and the switch 52 and between the low noise amplifier 21 and the switch 53. The impedance matching circuit may be composed of, for example, an inductor and/or a capacitor.

Although the two switches 52 and 53 are used for switching between connection and non-connection between the duplexer 61 and the transmission-reception filter 62 and the power amplifier 11 and the low noise amplifier 21 in the above embodiment, the switch configuration is not limited to this. For example, the switches 52 and 53 may be composed of a single switch. In this case, it is sufficient for the single switch to have five terminals connected to the transmission filter 61T, the reception filter 61R, the transmission-reception filter 62, the output terminal of the power amplifier 11, and the output terminal of the low noise amplifier 21.

For example, the shape and the size of each of the first partition wall 93a and the second partition wall 93b are not particularly restricted. For example, the first partition wall 93a may extend in a direction oblique or perpendicular to the y-axis direction or may meander along the y-axis direction. The first partition wall 93a may be substantially L-shaped in a plan view, like the second partition wall 93b. The second partition wall 93b may linearly extend along the y-axis direction or may extend in a direction oblique or perpendicular to the y-axis direction. The first partition wall 93a may be an annular wall body surrounding at least the periphery of the power amplifier 11. The second partition wall 93b may be an annular wall body surrounding at least the periphery of the low noise amplifier 21.

Each of the first partition wall 93a and the second partition wall 93b may not be in contact with the shielding film 95. One or more through holes or one or more slits, which pass through the wall body, may be provided in each of the first partition wall 93a and the second partition wall 93b. The slit may have, for example, a shape resulting from cutting out of the wall body downward from the upper end of the wall body or a shape resulting from cutting out of the wall body upward from the lower end of the wall body. Alternatively, the slit may have a shape resulting from cutting out of the wall body in a direction parallel to the main surface 91a or a direction oblique to the main surface 91a from the side end faces of the wall body (the contact face with the shielding film 95). Alternatively, each of the first partition wall 93a and the second partition wall 93b may be composed of multiple partial wall bodies that are isolated from each other. For example, the first partition wall 93a may be composed of multiple partial wall bodies that are linearly placed along the y-axis direction and that are arranged so as to be apart from each other. Each of the first partition wall 93a and the second partition wall 93b may have a shape in a plan view, which is a dotted line or a broken line having a predetermined line width. The areas R1 to R3 may not be completely isolated from each other, as described above.

Each of the first partition wall 93a and the second partition wall 93b may be formed by applying metal paste and solidifying the applied metal paste. Each of the first partition wall 93a and the second partition wall 93b may be formed by forming a gap corresponding to the partition wall in the resin member 92 and filling the gap with metal using the sputtering method. Alternatively, each of the first partition wall 93a and the second partition wall 93b may be formed by fixing a metal plate-shaped member to the main surface 91a with solder.

Although the example in which all the components composing the circuit of the radio-frequency module 1 are mounted on the main surface 91a of the module substrate 91, that is, the example in which single-side mounting is performed to the module substrate 91 is described in the above embodiment, the main surface used for the single-side mounting may be the main surface 91b of the module substrate 91. Specifically, the main surface 91b may be divided into three or more areas with the conductive member 93 and the power amplifier 11, the switch 51, and the low noise amplifier 21 are arranged in the respective areas.

Modes realized by making various modifications supposed by the person skilled in the art to each embodiment and modes realized by arbitrarily combining the components and the functions in each embodiment without necessarily departing from the scope of the present disclosure are also included in the present disclosure.

The present disclosure is applicable to a communication device, such as a mobile phone, as the radio-frequency module arranged in a front-end unit.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:
1. A radio-frequency module comprising:
a power amplifier;
a low noise amplifier;
a first switch connected to an antenna connection terminal;
a first filter that has a passband comprising a first communication band, that has a first end connected to the antenna connection terminal via the first switch, and that has a second end connected to an output terminal of the power amplifier or an input terminal of the low noise amplifier, the first communication band being a Time Division Duplex communication band; and
a module substrate on which the power amplifier, the low noise amplifier, the first switch, and the first filter are arranged,
wherein, as seen in a plan view of the module substrate, the first filter is arranged between the power amplifier and the first switch, and between the power amplifier and the low noise amplifier.

2. The radio-frequency module according to claim 1, further comprising:
a second filter that has a passband comprising an uplink operating band of a second communication band, that has a first end connected to the antenna connection terminal via the first switch, and that has a second end connected to the output terminal of the power amplifier, the second communication band being a Frequency Division Duplex communication band,
wherein, as seen in the plan view, the second filter is arranged between the power amplifier and the first switch.

3. The radio-frequency module according to claim 2, further comprising:
a second switch connected to the output terminal of the power amplifier,
wherein the first filter and the second filter are connected to the output terminal of the power amplifier via the second switch.

4. The radio-frequency module according to claim 3, further comprising:
a third filter that has a passband comprising a downlink operating band of the second communication band, that has a first end connected to the antenna connection terminal via the first switch, and that has a second end connected to the input terminal of the low noise amplifier,
wherein, as seen in the plan view, the third filter is arranged between the low noise amplifier and the first switch.

5. The radio-frequency module according to claim 4, further comprising:
a third switch connected to the input terminal of the low noise amplifier,
wherein the first filter and the third filter are connected to the input terminal of the low noise amplifier via the third switch.

6. The radio-frequency module according to claim 5, wherein the first filter is connected to the third switch via the second switch.

7. The radio-frequency module according to claim 4, wherein the module substrate has a first main surface and a second main surface that opposes the first main surface,
wherein the power amplifier, the first filter, the second filter, and the third filter are arranged on the first main surface, and
wherein the low noise amplifier, the first switch, the second switch, and a plurality of external connection terminals are arranged on the second main surface.

8. The radio-frequency module according to claim 4, wherein the module substrate has a first main surface and a second main surface that opposes the first main surface,
wherein the power amplifier, the low noise amplifier, the first switch, the second switch, the first filter, the second filter, and the third filter are arranged on the first main surface, and
wherein a plurality of external connection terminals is arranged on the second main surface.

9. The radio-frequency module according to claim 8, wherein, as seen in the plan view, the power amplifier and the first switch are arranged in adjacent quadrants of the module substrate, and the low noise amplifier is arranged in a quadrant diagonal to the quadrant in which the power amplifier is arranged.

10. The radio-frequency module according to claim 8, further comprising:
a ground conductor that is set to a ground potential,
wherein, as seen in the plan view, the ground conductor divides the first main surface into a first area, a second area, and a third area,
wherein, as seen in the plan view, the power amplifier and the second switch are arranged in the first area,
wherein, as seen in the plan view, the first switch, the first filter, the second filter, and the third filter are arranged in the second area, and
wherein, as seen in the plan view, the low noise amplifier is arranged in the third area.

11. The radio-frequency module according to claim 10, further comprising:
a resin layer that covers the power amplifier, the low noise amplifier, the first switch, the second switch, the first filter, the second filter, the third filter, and the first main surface; and
a shielding film that covers a surface of the resin layer,
wherein the ground conductor is in contact with the shielding film.

12. The radio-frequency module according to claim 1,
wherein, as seen in the plan view, the first filter is arranged between the power amplifier and the first switch in a first direction, and between the power amplifier and the low noise amplifier in a second direction, and
wherein the first direction is orthogonal to the second direction.

13. A communication apparatus comprising:
a signal processing circuit configured to process a radio-frequency signal; and
the radio-frequency module according to claim 1, configured to transmit the radio-frequency signal processed by the signal processing circuit.

* * * * *

UNITED STATES PATENT AND TRADEMARK OFFICE
CERTIFICATE OF CORRECTION

PATENT NO. : 11,431,361 B2
APPLICATION NO. : 17/396887
DATED : August 30, 2022
INVENTOR(S) : Hiromichi Kitajima et al.

It is certified that error appears in the above-identified patent and that said Letters Patent is hereby corrected as shown below:

In the Specification

Column 12, Line 65, "spieling" should be -- shieling --.

Signed and Sealed this
Sixth Day of June, 2023

Katherine Kelly Vidal
*Director of the United States Patent and Trademark Office*